United States Patent
Kunz et al.

(10) Patent No.: US 9,688,258 B2
(45) Date of Patent: Jun. 27, 2017

(54) METHOD FOR OPERATING A BRAKING SYSTEM OF A VEHICLE, AND CONTROL DEVICE FOR A BRAKING SYSTEM OF A VEHICLE

(71) Applicant: Robert Bosch GmbH, Stuttgart (DE)

(72) Inventors: Michael Kunz, Steinheim An der Murr (DE); Stefan Strengert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/650,369

(22) PCT Filed: Oct. 23, 2013

(86) PCT No.: PCT/EP2013/072119
§ 371 (c)(1),
(2) Date: Jun. 8, 2015

(87) PCT Pub. No.: WO2014/090467
PCT Pub. Date: Jun. 19, 2014

(65) Prior Publication Data
US 2015/0307073 A1 Oct. 29, 2015

(30) Foreign Application Priority Data
Dec. 12, 2012 (DE) .................. 10 2012 222 974

(51) Int. Cl.
*B60T 13/68* (2006.01)
*B60T 13/58* (2006.01)
(Continued)

(52) U.S. Cl.
CPC ............ *B60T 13/686* (2013.01); *B60T 8/267* (2013.01); *B60T 8/4872* (2013.01);
(Continued)

(58) Field of Classification Search
CPC ... B60T 8/26; B60T 8/48; B60T 8/266; B60T 8/268; B60T 13/585; B60T 13/586;
(Continued)

(56) References Cited

U.S. PATENT DOCUMENTS 5,951,115 A 9/1999 Sakai et al.
7,059,691 B2 6/2006 Tsunehara et al.
(Continued)

FOREIGN PATENT DOCUMENTS

CN 1603186 A 4/2005
DE 196 04 134 8/1997
(Continued)

OTHER PUBLICATIONS

International Search Report for PCT/EP2013/072119, dated Jan. 21, 2014.

*Primary Examiner* — Thomas J Williams
(74) *Attorney, Agent, or Firm* — Norton Rose Fulbright US LLP; Gerard Messina (57) ABSTRACT

In a method for operating a braking system of a vehicle by limiting brake pressure buildup during an activation of a brake actuating element, the rear wheel outlet valves of the rear wheel brake cylinders, which are respectively associated with a rear wheel of the vehicle, are controlled, at least temporarily, into an open state during the activation of the brake actuating element, and the front wheel inlet valves of the front wheel brake cylinders, which are respectively associated with a front wheel of the vehicle, are controlled, at least temporarily, into a closed state during the control of the rear wheel outlet valves into the open state.

8 Claims, 2 Drawing Sheets

(51) Int. Cl.
*B60T 8/26* (2006.01)
*B60T 8/48* (2006.01)
*B60T 13/16* (2006.01)
*B60T 13/66* (2006.01)

(52) U.S. Cl.
CPC .......... *B60T 13/162* (2013.01); *B60T 13/586* (2013.01); *B60T 13/662* (2013.01); *B60T 2270/604* (2013.01)

(58) Field of Classification Search
CPC ........ B60T 13/66; B60T 13/662; B60T 13/68; B60T 13/686

USPC .................................................. 303/151, 152
See application file for complete search history.

(56) References Cited

U.S. PATENT DOCUMENTS

| | | | | |
|---|---|---|---|---|
| 2009/0091180 | A1* | 4/2009 | Iwasaki | B60T 8/171 303/11 |
| 2012/0299367 | A1* | 11/2012 | Ross | B60T 8/4872 303/3 |
| 2013/0169032 | A1* | 7/2013 | Linhoff | B60T 13/586 303/3 |
| 2014/0244127 | A1* | 8/2014 | Strengert | B60T 1/10 701/70 |
| 2016/0059706 | A1* | 3/2016 | Kunz | B60T 8/4072 303/3 |

FOREIGN PATENT DOCUMENTS

| | | |
|---|---|---|
| JP | 2009 202678 | 9/2009 |
| WO | WO 2011/092308 | 8/2011 |
| WO | WO 2011/134987 | 11/2011 |
| WO | WO 2012/052488 | 4/2012 |

\* cited by examiner

METHOD FOR OPERATING A BRAKING SYSTEM OF A VEHICLE, AND CONTROL DEVICE FOR A BRAKING SYSTEM OF A VEHICLE

BACKGROUND OF THE INVENTION

1. Field of the Invention

The present invention relates to a method for operating a braking system of a vehicle, a control device for a braking system of a vehicle, and a braking system for a vehicle.

2. Description of the Related Art

A method and a device for controlling a braking system of a motor vehicle which includes an electric drive are described in published German patent application document DE 196 04 134 A1. During braking of the vehicle using the electric drive, for simultaneously charging a battery the aim is to reduce/deactivate the hydraulic braking torque exerted on at least one wheel by the at least one wheel brake cylinder of the hydraulic braking system, despite activating the brake pedal. For this purpose, the pressure medium which is displaced from the master brake cylinder to the wheel brakes by activating the brake pedal is to be counteracted by transferring the pressure medium, which is displaced from the master brake cylinder, via the at least one wheel brake cylinder into at least one storage chamber by opening the wheel outlet valves of the hydraulic braking system. The aim is that regenerative braking carried out by the electric drive may be blended in this way.

BRIEF SUMMARY OF THE INVENTION

The present invention allows a brake pressure to be adjusted to be equal to the response pressure, despite activating the brake actuating element which is connected to the master brake cylinder. Thus, despite the direct braking of the master brake cylinder by the driver, a brake pressure buildup via the response pressure is reliably preventable/stoppable in a first brake circuit as well as in a second brake circuit.

The present invention also achieves a displacement of brake fluid from the master brake cylinder of the braking system into at least one storage volume of the at least one brake circuit solely via the rear wheel brake cylinders, while the front wheel brake cylinders remain unfilled. This is ensured in that, for displacing the brake fluid from the master brake cylinder into the at least one storage volume, the rear wheel outlet valves (and the rear wheel inlet valves) are opened, while the front wheel inlet valves (at least temporarily) are/remain closed. The present invention thus ensures a brake pressure of (virtually) zero in the front wheel brake cylinders, despite the residual brake pressure/response pressure, not equal to zero, present in the brake circuits. As a result of applying the present invention, no residual grinding torques remain at the front wheel brake cylinders. The present invention may thus be used for protecting the brake linings of the front wheel brake cylinders.

The present invention additionally makes use of the fact that conventional braking systems are frequently equipped with different wheel brake cylinders for the respective axles of the vehicle. Rear wheel brake cylinders, whose constants are significantly smaller than the constants of the front wheel brake cylinders associated with a front axle of the vehicle, are generally associated with a rear axle of the vehicle. The constants of the front wheel brake cylinders are typically larger than the constants of the rear wheel brake cylinders by at least a factor of between 2 and 3. Since the constants of the wheel brake cylinders represent a quotient of the braking torque which acts and a brake pressure which is present in the particular wheel brake cylinders, the same pressure in the rear wheel brake cylinders and the front wheel brake cylinder thus brings about a front wheel braking torque which is generated with the aid of the front wheel brake cylinders, and which is larger than a rear wheel braking torque brought about by the rear wheel brake cylinders by at least a factor of between 2 and 3. Since a brake pressure of (virtually) zero is achievable in the front wheel brake cylinders when the present invention is applied, the total braking torque, made up of the sum of the front wheel braking torque and the rear wheel braking torque, may be significantly reduced.

The method according to the present invention and the corresponding control device are therefore advantageous in particular for a recuperative braking system. By use of the present invention for a recuperative braking system, the recuperation efficiency may be increased during a recuperation, and a vehicle battery may thus be charged more quickly. The present invention thus ensures driving of a vehicle with lower energy consumption and reduced pollutant emissions. However, it is pointed out that the usability of the present invention is not limited to recuperative braking systems.

In one advantageous specific embodiment, the rear wheel inlet valves of the rear wheel brake cylinders are controlled, at least temporarily, into an open state during the control of the rear wheel outlet valves of the rear wheel brake cylinders into the open state. Thus, the brake fluid volume displaced from the master brake cylinder may be reliably displaced into the storage volumes of the brake circuits via the open rear wheel inlet valves and the likewise open rear wheel outlet valves.

During the control of the rear wheel outlet valves of the rear wheel brake cylinders into the open state, the front wheel inlet valves of the front wheel brake cylinders are preferably controlled into the closed state in a delayed manner in such a way that the front wheel brake cylinders are pre-filled without a brake pressure buildup. The so-called dead volume of the front wheel brake cylinders may be overcome in this way. A desirable brake pressure buildup in the front wheel brake cylinders may thus be quickly and reliably carried out.

As an alternative, however, for limiting the pressure buildup in the brake circuits to the response pressure, the rear wheel outlet valves may be controlled into the open state, and at the same time, the front wheel brake cylinders may be controlled into the closed state.

In one advantageous refinement, prior to limiting the pressure buildup in the brake circuits to the response pressure, it is ascertained whether a generator braking torque corresponding to an activation intensity of the activation of the brake actuating element is exertable with the aid of at least one electric motor of the vehicle, and the limiting of the pressure buildup in the brake circuits to the response pressure is carried out only if the generator braking torque corresponding to the activation intensity is exertable with the aid of the at least one electric motor. The brake pressure in the two brake circuits, which is reduced compared to the related art, may thus be utilized to exert a comparatively large generator braking torque on the vehicle, without exceeding a setpoint total braking torque specified by the driver. The advantageous method thus allows more rapid charging of a vehicle battery.

In one advantageous specific embodiment, if, after limiting the pressure buildup in the brake circuits to the response pressure, it is ascertained that the generator braking torque corresponding to the activation intensity is no longer exertable with the aid of the at least one electric motor, the front wheel inlet valves of the front wheel brake cylinders are controlled from the closed state into an open state. In this way, with the aid of a brake pressure buildup in the front wheel brake cylinders, a response to reduced usability of the at least one electric motor and/or to a comparatively high driver braking input may be made quickly and reliably.

After a control of the front wheel inlet valves from the closed state into the open state, a Δp regulation may optionally be carried out with the aid of the rear wheel inlet valves of the rear wheel brake cylinders. The brake pressure in the brake circuits may thus be adjusted precisely in such a way that a setpoint deceleration specified by the driver is reliably maintainable.

In addition, if, after controlling the front wheel inlet valves from the closed state into the open state, it is ascertained that the generator braking torque corresponding to the activation intensity is once again exertable with the aid of the at least one electric motor, the brake pressure present in the brake circuits is limited to the response pressure by controlling the rear wheel outlet valves into the open state. The brake pressure present in the brake circuits may thus be reliably reduced to the response pressure in this type of situation as well.

The above-mentioned advantages are also ensured in this type of control device for a braking system of a vehicle. It is expressly pointed out that the control device may be refined corresponding to the specific embodiments of the method for operating a braking system of a vehicle.

Furthermore, the described advantages are ensured in a braking system for a vehicle which includes this type of control device.

BRIEF DESCRIPTION OF THE DRAWINGS

FIGS. 2a through 2d show four coordinate systems for illustrating one specific embodiment of the method for operating a recuperative braking system.

DETAILED DESCRIPTION OF THE INVENTION

Figure 1:
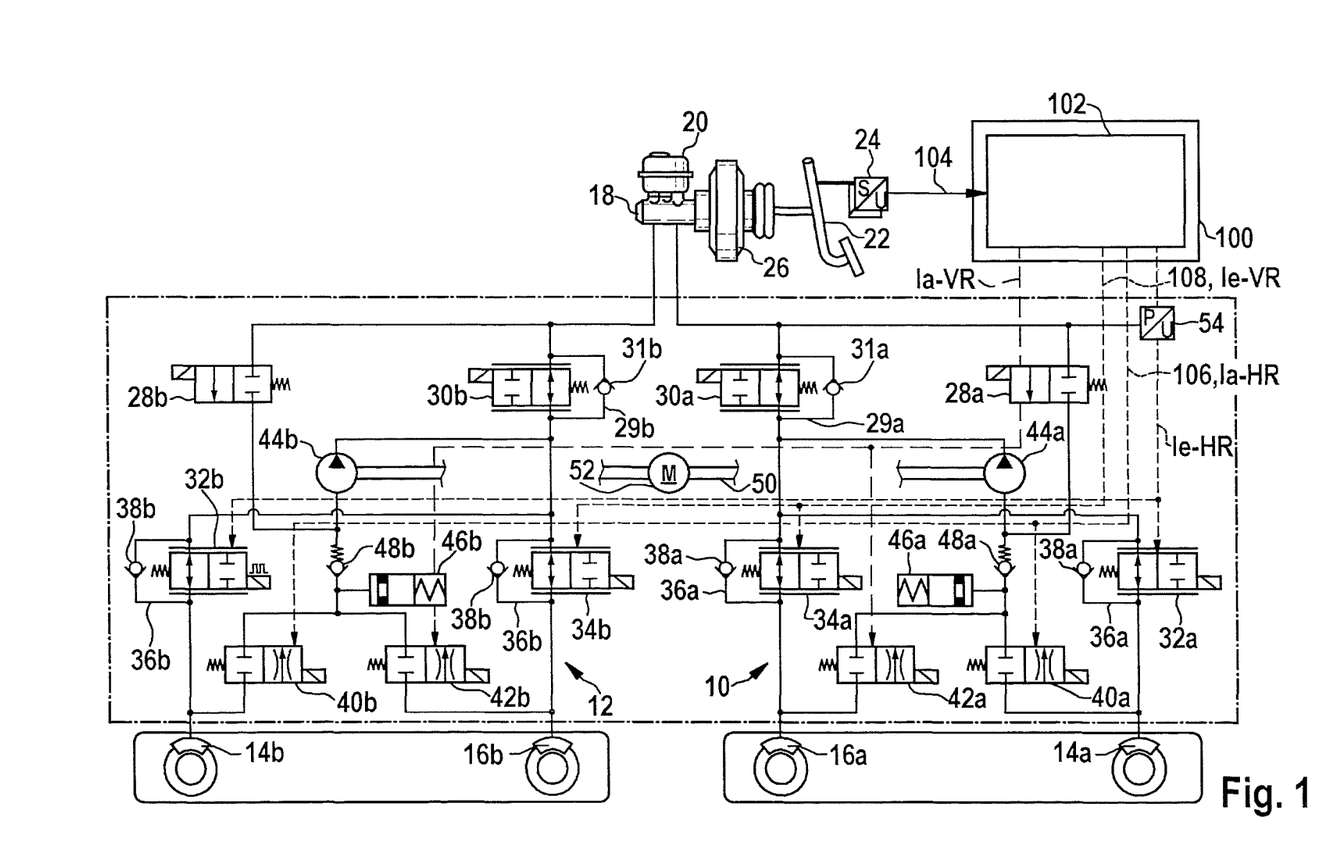
FIG. 1 shows a schematic illustration of one specific embodiment of the control device.

FIG. 1 shows a schematic illustration of one specific embodiment of the control device.

Control device 100 and the braking system which cooperates with it, schematically depicted in FIG. 1, are advantageously usable in a hybrid vehicle or in an electric vehicle, for example. However, the usability of control device 100 and of the braking system described below is not limited to use in a hybrid vehicle or in an electric vehicle.

The braking system, depicted as an example here, includes a first brake circuit 10 and a second brake circuit 12 with two wheel brake cylinders 14a, 14b, 16a and 16b, respectively. Each of the two brake circuits 10 and 12 optionally includes a rear wheel brake cylinder 14a or 14b and a front wheel brake cylinder 16a or 16b. However, the braking system described below is not limited to this type of brake circuit division (X brake circuit division). For example, the wheels associated with a brake circuit 10 and 12 may also be situated on the same axle of the vehicle, or on one side of the vehicle.

The braking system includes a master brake cylinder 18 which may be designed as a tandem master brake cylinder, for example. Master brake cylinder 18 may be connected to a brake fluid reservoir 20 via at least one brake fluid exchange opening, for example a snifting bore. However, the usability of control device 100 is not limited to the use of a tandem master brake cylinder or to a specific design of master brake cylinder 18.

The braking system preferably includes a brake actuating element 22, for example a brake pedal, which is situated at master brake cylinder 18. Brake actuating element 22 is advantageously situated directly or indirectly at master brake cylinder 18 in such a way that when brake actuating element 22 is activated with at least a minimum braking activation intensity, a driver braking force applied to brake actuating element 22 is transmittable to the at least one displaceable piston of master brake cylinder 18, for example to a rod piston and a floating piston, in such a way that the at least one piston is displaceable with the aid of the driver braking force. An internal pressure in at least one pressure chamber of master brake cylinder 18 is preferably increased with the aid of this displacement of the at least one piston.

The braking system preferably also includes at least one brake actuating element sensor 24, with the aid of which the activation intensity of the activation of brake actuating element 22 is ascertainable by the driver. Brake actuating element sensor 24 may be a pedal travel sensor, a differential travel sensor, and/or a rod travel sensor, for example. However, for detecting the activation intensity which corresponds to the driver braking input, some other type of sensor system may be used instead of or in addition to the types of sensors described here.

The illustrated braking system also includes a brake booster 26. With the aid of brake booster 26, a booster force may be exerted on the at least one piston of master brake cylinder 18 in such a way that activation of brake actuating element 22 is facilitated for the driver. Brake booster 26 may in particular be a continuously regulatable/continuously controllable brake booster.

The braking system illustrated in FIG. 1 includes an electromechanical brake booster 26. An electromechanical brake booster 26 is characterized by a variable booster force. With the aid of electromechanical brake booster 26, it is thus possible to easily influence the brake actuation force which is perceivable to the driver during braking. Instead of an electromechanical brake booster 26, however, the braking system which cooperates with control device 100 may include some other type of brake booster 26.

Further components of the specific embodiment of the braking system are described below with reference to FIG. 1. It is expressly pointed out that the components of the braking system described below represent only an example of one possible design of the advantageous braking system. One advantage of control device 100, described in greater detail below, is that brake circuits 10 and 12 which cooperate with it are not limited to a specific design, or to the use of specific components. Instead, brake circuits 10 and 12 may be modified with a high degree of freedom of choice without impairing the usability and the advantages of control device 100.

Each of brake circuits 10 and 12 is designed in such a way that the driver is able to directly brake wheel brake cylinders 14a, 14b, 16a, and 16b via master brake cylinder 18.

Each of brake circuits 10 and 12 includes a high-pressure switching valve 28a or 28b, and a changeover valve 30a or 30b (each with a bypass line 29a and 29b, running in parallel thereto, and a check valve 31a and 31b situated in each bypass line 29a and 29b).

In first brake circuit 10, a rear wheel inlet valve 32a is associated with rear wheel brake cylinder 14a, and a front wheel inlet valve 34a is associated with front wheel brake cylinder 16a, each with a bypass line 36a running in parallel thereto, and with a check valve 38a situated in each bypass line 36a. In addition, a rear wheel outlet valve 40a is associated with rear wheel brake cylinder 14a, and a front wheel outlet valve 42a is associated with front wheel brake cylinder 16a. Similarly, in second brake circuit 12, a rear wheel inlet valve 32b is associated with rear wheel brake cylinder 14b, and a front wheel inlet valve 34b is associated with front wheel brake cylinder 16b. In each case a bypass line 36b with a check valve 38b situated therein runs in parallel to each of the two wheel inlet valves 32b and 34b of second brake circuit 12. In addition, in second brake circuit 12 a rear wheel outlet valve 40b is associated with rear wheel brake cylinder 14b, and a front wheel outlet valve 42b is associated with front wheel brake cylinder 16b.

In addition, each of brake circuits 10 and 12 includes a pump 44a and 44b, whose intake side is connected to wheel outlet valves 40a and 42a or 40b and 42b, and whose pressure side faces wheel inlet valves 32a and 34a or 32b and 34b. Each of brake circuits 10 and 12 additionally includes a storage chamber 46a or 46b, as a storage volume 46a or 46b, situated between wheel outlet valves 40a and 42a or 40b and 42b, and associated pump 44a or 44b, and a pressure relief valve 48a or 48b situated between pump 44a or 44b, and storage chamber 46a or 46b. Each of storage chambers 46a and 46b may in particular be a low-pressure storage chamber. It is pointed out that storage chambers 46a and 46b are usable as ESP storage chambers in the two brake circuits 10 and 12.

Pumps 44a and 44b may be situated on the same shaft 50 of a motor 52. Each of pumps 44a and 44b may be designed as a three-piston pump. Instead of a three-piston pump, however, some other type of pump may be used for at least one of pumps 44a and 44b. Modulation systems having a different design, such as pumps including more or fewer pistons, asymmetrical pumps, or gear pumps, are likewise usable. The braking system which cooperates with control device 100 may thus be designed as a modified standard modulation system, in particular as a six-piston ESP system.

Furthermore, each of the two brake circuits 10 and 12 may also include at least one pressure sensor 54, in particular for ascertaining a system pressure and/or a circuit pressure.

The above-described braking system is controllable with the aid of control device 100, described below. However, it is pointed out once more that the usability of control device 100 described below is not limited to the cooperation with a braking system having this type of design.

Control device 100 described below may be integrated in particular into a control electronics system of the braking system. However, it is pointed out that the design of control device 100 is not limited to this type of integration. For example, control device 100 may also be used together with a control electronics system of the braking system which is provided and situated separately.

Control device 100 includes an actuating device 102, with the aid of which at least rear wheel outlet valves 40a and 40b and front wheel inlet valves 34a and 34b of the two brake circuits 10 and 12 are actuatable. The actuation of rear wheel outlet valves 40a and 40b and of front wheel inlet valves 34a and 34b of the two brake circuits 10 and 12 by actuating device 102 takes place taking into account at least one provided sensor signal 104 with regard to an activation intensity of an activation by a driver of the vehicle of brake actuating element 22 which is connected to master brake cylinder 18. Sensor signal 104 may be provided in particular by brake actuating element sensor 24 already mentioned above. The activation intensity taken into account during the actuation is, for example, an ascertained driver braking force, a driver brake pressure, and/or an actuating travel/displacement travel of brake actuating element 22, such as a rod travel in particular. However, the options presented here for the activation intensity are to be interpreted only as examples.

Rear wheel outlet valves 40a and 40b of rear wheel brake cylinders 14a and 14b, which are associated with a respective rear wheel of the vehicle, are controllable into an open state with the aid of at least one first control signal 106 of actuating device 102. During the provision of the at least one first control signal 106 to rear wheel outlet valves 40a and 40b, front wheel inlet valves 34a and 34b of front wheel brake cylinders 16a and 16b, which are associated with a respective front wheel of the vehicle, are controllable, at least temporarily, into a closed state with the aid of at least one second control signal 108 of actuating device 102. Brake fluid may be displaced into storage volumes/storage chambers 46a and 46b via rear wheel outlet valves 40a and 40b of rear wheel brake cylinders 14a and 14b, which are controlled into the open state with the aid of first control signal 106 of actuating device 102 (and via at least partially open rear wheel inlet valves 32a and 32b of rear wheel brake cylinders 14a and 14b). In this way, a brake pressure buildup in brake circuits 10 and 12 may be limited to a response pressure of storage chambers/storage volumes 46a and 46b of brake circuits 10 and 12, despite brake fluid being displaced from master brake cylinder 18 into brake circuits 10 and 12 due to an activation of brake actuating element 22. At the same time, by at least temporarily controlling front wheel inlet valves 34a and 34b of front wheel brake cylinders 16a and 16b, into the closed state with the aid of the at least one second control signal 108 of actuating device 102, a brake pressure of (virtually) zero in front wheel brake cylinders 16a and 16b may be ensured.

During the displacement of brake fluid into storage volume/storage chambers 46a and 46b, a brake pressure which is (approximately) equal to the response pressure is present in rear wheel brake cylinders 14a and 14b, while a brake pressure of (virtually) zero is present in front wheel brake cylinders 16a and 16b. Also in an interim period between the displacement of brake fluid into storage volumes/storage chambers 46a and 46b and a subsequent (desirable) pressure buildup in brake circuits 10 and 12, the brake pressure in rear wheel brake cylinders 14a and 14b is (approximately) equal to the response pressure, while a brake pressure of (virtually) zero is achieved in front wheel brake cylinders 16a and 16b.

Thus, during the displacement of brake fluid into storage volumes 46a and 46b and during the interim period, only a rear wheel braking torque which corresponds to the response pressure acts on the rear wheels, at the same time, a front wheel braking torque of (virtually) zero being present at the front wheels. The resulting "hydraulic" braking torque made up of the rear wheel braking torque and the front wheel braking torque is therefore comparatively low.

Control device 100 additionally makes use of the fact that different types of wheel brake cylinders 14a, 14b, 16a, and 16b are generally used on the various axles of a vehicle. In general, the following expression is valid for rear wheel braking torque $M_{HR}$ which is exerted on the rear wheels:

$$M_{HR} = 2 * p * c_{HR},\qquad\text{(Equation 1)}$$

where p is the brake pressure present in rear wheel brake cylinders 14a and 14b, and $c_{HR}$ is the constant of rear wheel brake cylinders 14a and 14b.

Similarly, the following expression frequently applies for front wheel braking torque $M_{VR}$ which is exerted on the front wheels:

$$M_{VR} = 2 * p * c_{VR},\qquad\text{(Equation 2)}$$

where p is the brake pressure present in front wheel brake cylinders 16a and 16b, and $c_{VR}$ is the constant of front wheel brake cylinders 16a and 16b.

In general, the following applies:

$$c_{VR} \geq 2 * c_{HR}.\qquad\text{(Equation 3)}$$

The actuation of rear wheel outlet valves 40a and 40b of rear wheel brake cylinders 14a and 14b, via the at least one first control signal 106, and the actuation, carried out at least temporarily during same, of front wheel inlet valves 34a and 34b of front wheel brake cylinders 16a and 16b, via the at least one second control signal 108 thus brings about a "hydraulic" braking torque $M_h$:

$$M_h = 2 * p * c_{HR}.\qquad\text{(Equation 4)}$$

If, instead of rear wheel outlet valves 40a and 40b, front wheel outlet valves 42a and 42b were used for displacing the brake fluid, the following would apply:

$$M_h \geq 4 * p * c_{HR}.\qquad\text{(Equation 5)}$$

The low "hydraulic" braking torque $M_h$ given in Equation 4, despite the activation of the brake actuating element, may be utilized for increasing a generator braking torque which is provided with the aid of at least one electric motor (not illustrated). A battery of the vehicle equipped with the braking system may thus be charged more quickly without a vehicle deceleration, specified by a driver by activating brake actuating element 22, being exceeded during the charging operation.

The braking system equipped with control device 100 thus combines the advantages of a high recuperation efficiency with the capability of carrying out blending. In addition, by using control device 100 it is possible to carry out the blending without retroactive effects on brake actuating element 22 being noticeable to the driver.

It is expressly pointed out that when control device 100 is used, a level of the response pressure of storage chambers 46a and 46b, used as storage volumes 46a and 46b of brake circuits 10 and 12, becomes less important. The response pressure of storage volumes 46a and 46b of brake circuits 10 and 12 may thus also be comparatively high without "hydraulic" braking torque $M_h$, which results from the response pressure/residual pressure, becoming extremely large. Thus, inexpensive storage volumes 46a and 46b may also be used together with control device 100.

In addition, wear of the brake linings of the front wheels may be prevented/delayed by controlling front wheel inlet valves 34a and 34b of front wheel brake cylinders 16a and 16b, into the closed state with the aid of the at least one second control signal 108 of actuating device 102. Control device 100 may thus also be used for protecting the brake linings.

Furthermore, control device 100 may be additionally designed for carrying out the method steps described below. In particular, control signals Ie-HR, Ie-VR, Ia-HR, and Ia-VR described below may be outputtable by control device 100, control signal Ie-HR being outputtable/output to rear wheel inlet valves 32a and 32b, control signal Ie-VR (as second control signal 108) being outputtable/output to front wheel inlet valves 34a and 34b, control signal Ia-HR (as first control signal 106) being outputtable/output to rear wheel outlet valves 40a and 40b, and control signal Ia-VR being outputtable/output to front wheel outlet valves 42a and 42b.

A more detailed description of further achievable modes of operation of control device 100 is therefore dispensed with here.

The above-described advantages are also achieved in a braking system for a vehicle which includes control device 100 or an appropriate refinement of control device 100. It is expressly pointed out that in the braking system, control device 100 is not designed just for outputting at least the control signals. Rather, control device 100 is wired at least to valves 34a, 34b, 40a and 40b in such a way that (during operation of the braking system) at least first control signal 106 is outputtable/output to rear wheel outlet valves 40a and 40b, and second control signal 108 is outputtable/output to front wheel inlet valves 34a and 34b. In one advantageous refinement, the braking system includes wiring which ensures that control signal Ie-HR is outputtable/output to rear wheel inlet valves 32a and 32b, control signal Ie-VR (as second control signal 108) is outputtable/output to front wheel inlet valves 34a and 34b, control signal Ia-HR (as first control signal 106) is outputtable/output to rear wheel outlet valves 40a and 40b, and control signal Ia-VR is outputtable/output to front wheel outlet valves 42a and 42b.

Figure 2A:
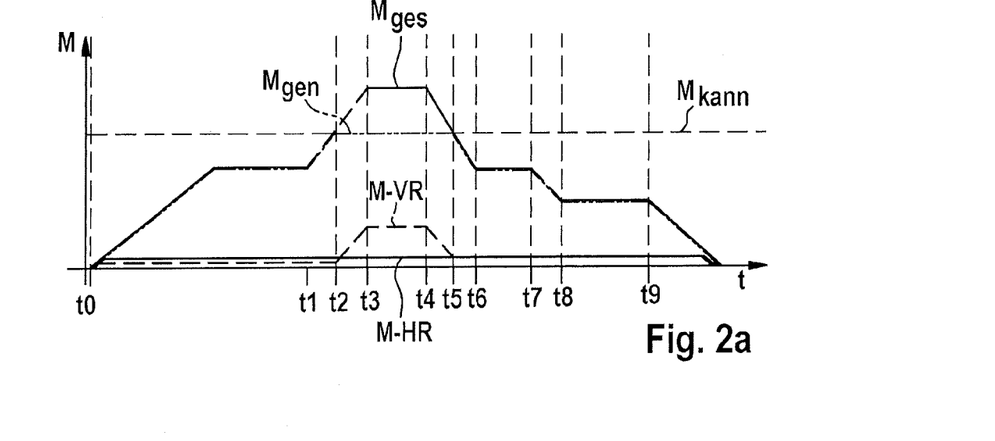
Figure 2B:
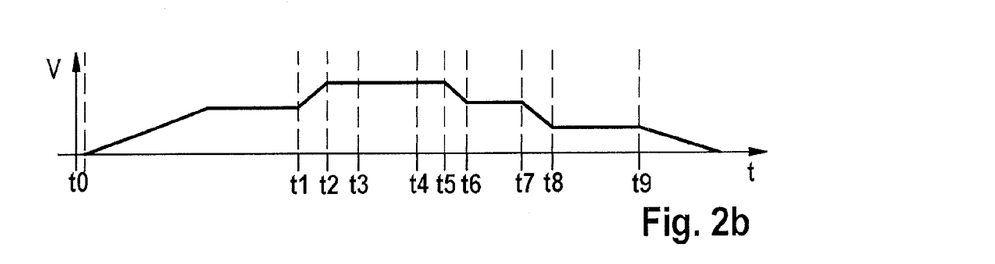
Figure 2C:
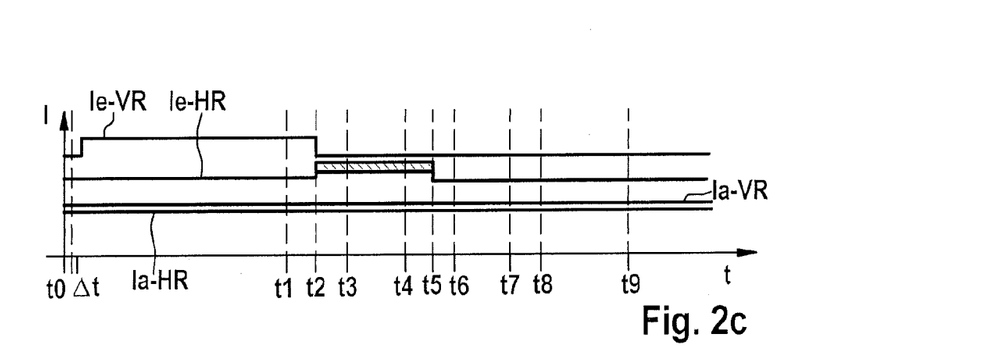

FIGS. 2a through 2c show three coordinate systems for illustrating one specific embodiment of the method for operating a braking system of a vehicle.

For better clarity, the method is described using the recuperative braking system explained above. However, the practicability of the method is not limited to the use of the above-described braking system.

In the coordinate systems in FIGS. 2a through 2c, the abscissa is time axis t. The ordinate of the coordinate system in FIG. 2a depicts a braking torque M. The ordinate of the coordinate system in FIG. 2b is a storage volume V which is temporarily stored in the storage chambers/storage volumes of the brake circuits. A (normalized) current intensity I is indicated by the ordinate of the coordinate system in FIG. 2c.

Up until a point in time t0, the driver exerts no force on the brake actuating element. Thus, up until point in time t0, the brake actuating element of the braking system operated with the aid of the method is in its starting position/unactivated position.

Beginning at point in time t0, the driver exerts an increasing force on the brake actuating element, causing displacement of same. However, between points in time t0 and t1, setpoint total braking torque Mges requested by the driver is below a maximum possible generator braking torque Mkann which is providable with the aid of at least one electric motor. Thus, between points in time t0 and t1, (provided) generator braking torque Mgen is correspondingly set to setpoint total braking torque Mges, and the entire driver braking input is met purely regeneratively.

For carrying out the purely regenerative braking, during points in time t0 and t1 a brake pressure buildup in the brake circuits of the braking system is limited by the driver of the vehicle to a response pressure of the storage chambers/storage volumes of the brake circuits, despite the activation of the brake actuating element situated at the master brake cylinder of the braking system. This takes place by a control of the rear wheel outlet valves of the rear wheel brake cylinders, which are associated with a respective rear wheel of the vehicle, into the open state. In contrast, during the control of the rear wheel outlet valves into the open state, the front wheel inlet valves of the front wheel brake cylinders, which are associated with a respective front wheel of the vehicle, are controlled, at least temporarily, into a closed state. In this way, a brake pressure buildup may be successfully counteracted via the response pressure of the storage chambers/storage volumes, despite a brake fluid which is displaced from the master brake cylinder of the braking system into the brake circuits.

During points in time t0 and t1, the driver thus displaces a brake fluid volume from the master brake cylinder into the storage chambers, as the result of which storage volume V increases. Thus, between points in time t0 and t1, a brake pressure which is equal to the response pressure of the storage chambers/storage volumes is present in the rear wheel brake cylinders, and a brake pressure of (virtually) zero is present in the front wheel brake cylinders. The rear wheel brake cylinders thus bring about a rear wheel braking torque M-HR, which is equal to a "response pressure braking torque," between points in time t0 and t1. A front wheel braking torque M-VR of the front wheel brake cylinders of (virtually) zero is present between points in time t0 and t1. Thus, due to the limitation of the pressure buildup in the brake circuits which is brought about during points in time t0 and t1, a comparatively high generator braking torque Mgen may be exerted on the vehicle with the aid of the at least one electric motor. Despite high generator braking torque Mgen being exerted, due to the above-described method steps it is reliably ensured that setpoint total braking torque Mges specified by the driver with the aid of the brake actuation is not exceeded.

In one design of the rear wheel outlet valves of the rear wheel brake cylinders of the brake circuits as de-energized closed valves, a control signal Ia-HR, not equal to zero, between points in time t0 and t1 (as the first control signal) is output to the rear wheel outlet valves. During the control of the rear wheel outlet valves of the rear wheel brake cylinders into the open state, the rear wheel inlet valves of the rear wheel brake cylinders are also controlled, at least temporarily, into an open state. For controlling the rear wheel inlet valves of the rear wheel brake cylinders into the open state, in one design of the rear wheel inlet valves as de-energized open valves a control signal Ie-HR, equal to zero, may be output to the rear wheel inlet valves of the rear wheel brake cylinders. In one design of the front wheel inlet valves of the front wheel brake cylinders as de-energized open valves, a control signal Ie-VR, not equal to zero, is provided to the front wheel inlet valves between points in time t0 and t1 (as the second control signal). The front wheel outlet valves of the front wheel brake cylinders of the two brake circuits are also advantageously closed between points in time t0 and t1. If the front wheel outlet valves of the front wheel brake cylinders are de-energized closed valves, this is achievable with the aid of a control signal Ia-VR equal to zero.

In one advantageous specific embodiment of the method, for limiting the pressure buildup in the brake circuits to the response pressure, the front wheel inlet valves of the front wheel brake cylinders are controlled (simultaneously/during the control of the rear wheel outlet valves into the open state) in a delayed manner into the closed state in such a way that the front wheel brake cylinders are pre-filled without a brake pressure buildup. In this way, a dead volume may be overcome prior to closing of the front wheel inlet valves of the front wheel brake cylinders. Due to pre-filling the front wheel brake cylinders, the sudden loss of brake pressure/residual pressure, which is present in the brake circuits, during a subsequent opening of the front wheel inlet valves is preventable. This type of sudden loss of a brake pressure/residual pressure is often noticeable to a driver during activation of the brake actuating element, and is perceived by the driver as unfavorable. However, this impairment of comfort is reliably preventable by the pre-filling of the front wheel brake cylinders. In addition, the delayed closing of the front wheel inlet valves ensures that an unnecessarily large storage volume V in the storage chambers/storage volumes does not have to be provided. In this way, a burden on the service life of the storage chambers/storage volumes may also be reduced, and the service life/use period of use of the storage chambers/storage volumes may be increased.

The delayed control of the front wheel brake cylinders into the closed state may be understood to mean that the front wheel brake cylinders are left in the open state for a brief delay period $\Delta t$. The front wheel brake cylinders are controlled into the closed state immediately after delay period $\Delta t$. Thus, with the exception of delay period $\Delta t$, during the control of the rear wheel outlet valves into the open state it is ensured that the front wheel brake cylinders are in the closed state. However, as an alternative to a delayed control of the front wheel brake cylinders into the closed state, a simultaneous control of the rear wheel outlet valves into the open state and of the front wheel brake cylinders into the closed state may be carried out.

The increase of control signal Ie-VR from 0 to 1 for closing the front wheel inlet valves is therefore preferably carried out taking into account a provided sensor signal of a brake actuating element sensor, such as a pedal travel sensor. The brake fluid volume already displaced from the master brake cylinder into the brake circuits, and in particular into the front wheel brake cylinders, may be ascertained/estimated based on a sensor signal of a brake actuating element sensor. Thus, the closing of the front wheel inlet valves of the front wheel brake cylinders may be started only after a brake fluid volume which corresponds to the typical initial dead volume has been displaced into the front wheel brake cylinders. It may thus be reliably ensured that, despite the (slight) filling of the front wheel brake cylinders, there is still no buildup of brake pressure in same. At the same time, it may be ensured that the brake pressure/residual pressure present in the brake circuits is not lost during a subsequent opening of the front wheel inlet valves.

Prior to limiting the pressure buildup in the brake circuits to the response pressure, it is preferably ascertained whether a generator braking torque Mgen corresponding to an activation intensity of the activation of the brake actuating element is exertable with the aid of the at least one electric motor of the vehicle. The limiting of the pressure buildup in the brake circuits to the response pressure is optionally carried out only if generator braking torque Mgen corresponding to the activation intensity is also exertable with the aid of the at least one electric motor.

It is also pointed out that in a braking system having an X brake circuit division, a comparatively large maximum possible providable generator braking torque Mkann is generally present. The described advantages during points in time t0 and t1 may thus frequently be utilized for the entire course of the braking operations.

If, after the limiting of the pressure buildup in the brake circuits to the response pressure, it is ascertained that generator braking torque Mgen corresponding to the activation intensity is no longer exertable with the aid of the at least one electric motor, the following procedure may be carried out in order to still reliably brake the vehicle:

Beginning at time t2, increasing setpoint total braking torque Mges specified by the driver approaches maximum possible providable generator braking torque Mkann. Therefore, to continue to give the driver a standard brake actuation feel/pedal feel, a brake pressure buildup in the front wheel brake cylinders is carried out beginning at time t2. For this purpose, the front wheel inlet valves of the front wheel brake cylinders are controlled from the closed state into an open state. In this way a brake pressure buildup in the front wheel brake cylinders may be brought about by further activation of the brake actuating element by the driver. Beginning at time t1, the front wheel brake cylinders thus bring about a front wheel braking torque M-VR which is not equal to 0. If the activation intensity of the activation of the brake actuating element remains constant beginning at time t2, front wheel braking torque M-VR brought about with the aid of the front wheel brake cylinders also does not increase. A decrease in the activation intensity beginning at time t3 also brings about a corresponding decrease in front wheel braking torque M-VR.

Due to the use of the front wheel brake cylinders for applying front wheel braking torque M-VR in addition to generator braking torque Mgen, it may be ensured that the comparatively large constant of the front wheel brake cylinders is utilizable for maintaining setpoint vehicle deceleration Mges specified by the driver.

A Δp regulation with the aid of the rear wheel inlet valves of the rear wheel brake cylinders is preferably carried out after controlling the front wheel inlet valves from the closed state into the open state between points in time t1 and t4. Front wheel braking torque M-VR is precisely settable to a preferred value in this way.

If, after controlling the front wheel inlet valves from the closed state into the open state, it is ascertained that generator braking torque Mgen corresponding to the activation intensity is once again exertable with the aid of the at least one electric motor, the brake pressure present in the brake circuits may once again be limited to the response pressure. This is carried out, for example, after time t4, after setpoint total braking torque Mges requested by the driver falls below maximum possible providable generator braking torque Mkann. For limiting the brake pressure which is present in the brake circuits to the response pressure, only the rear wheel outlet valves are controlled into the open state. The front wheel inlet valves may also be left in the open state after time t4. Up until a time t5, beginning at which the driver discontinues the activation of the brake actuating element, only the response pressure of the storage volumes is thus present in all wheel brake cylinders.

What is claimed is:

1. A method for operating a braking system of a vehicle, comprising:
    limiting, at least temporarily, a brake pressure buildup in at least one brake circuit of the braking system to a response pressure of a storage volume of the at least one brake circuit during an activation by a driver of the vehicle of a brake actuating element connected to a master brake cylinder of the braking system, by controlling at least one wheel outlet valve of at least one wheel brake cylinder of the at least one brake circuit into an open state;
    wherein rear wheel outlet valves of rear wheel brake cylinders, which are respectively associated with rear wheels of the vehicle, are controlled, at least temporarily, into the open state during the activation of the brake actuating element, and front wheel inlet valves of front wheel brake cylinders, which are respectively associated with front wheels of the vehicle, are controlled, at least temporarily, into a closed state during the control of the rear wheel outlet valves into the open state, wherein during the control of the rear wheel outlet valves of the rear wheel brake cylinders into the open state, the front wheel inlet valves of the front wheel brake cylinders are controlled into the closed state in a delayed manner in such a way that the front wheel brake cylinders are pre-filled without a brake pressure buildup.

2. The method as recited in claim 1, wherein rear wheel inlet valves of the rear wheel brake cylinders are controlled, at least temporarily, into an open state during the control of the rear wheel outlet valves of the rear wheel brake cylinders into the open state.

3. The method as recited in claim 1, wherein for limiting the pressure buildup in the at least one brake circuit to the response pressure, the rear wheel outlet valves are controlled into the open state, and at the same time, the front wheel brake cylinders are controlled into the closed state.

4. The method as recited in claim 1, further comprising:
    prior to limiting the pressure buildup in the at least one brake circuit to the response pressure, ascertaining whether a generator braking torque corresponding to an activation intensity of the activation of the brake actuating element is exertable with the aid of at least one electric motor of the vehicle, wherein the limiting of the pressure buildup in the at least one brake circuit to the response pressure is carried out only if the generator braking torque corresponding to the activation intensity is exertable with the aid of the at least one electric motor.

5. The method as recited in claim 4, wherein if, after the limiting of the pressure buildup in the at least one brake circuit to the response pressure, it is ascertained that the generator braking torque corresponding to the activation intensity is no longer exertable with the aid of the at least one electric motor, the front wheel inlet valves of the front wheel brake cylinders are controlled from the closed state into an open state.

6. The method as recited in claim 5, wherein after a control of the front wheel inlet valves from the closed state into the open state, a differential pressure regulation is carried out with the aid of rear wheel inlet valves of the rear wheel brake cylinders.

7. A method for operating a braking system of a vehicle, comprising:
    limiting, at least temporarily, a brake pressure buildup in at least one brake circuit of the braking system to a response pressure of a storage volume of the at least one brake circuit during an activation by a driver of the vehicle of a brake actuating element connected to a master brake cylinder of the braking system, by controlling at least one wheel outlet valve of at least one wheel brake cylinder of the at least one brake circuit into an open state;
    wherein rear wheel outlet valves of rear wheel brake cylinders, which are respectively associated with rear wheels of the vehicle, are controlled, at least temporarily, into the open state during the activation of the brake actuating element, and front wheel inlet valves of front wheel brake cylinders, which are respectively associated with front wheels of the vehicle, are controlled, at least temporarily, into a closed state during the control of the rear wheel outlet valves into the open state;
    prior to limiting the pressure buildup in the at least one brake circuit to the response pressure, ascertaining whether a generator braking torque corresponding to an activation intensity of the activation of the brake actuating element is exertable with the aid of at least one electric motor of the vehicle, wherein the limiting of the pressure buildup in the at least one brake circuit to the response pressure is carried out only if the generator braking torque corresponding to the activation intensity is exertable with the aid of the at least one electric motor, wherein if, after the limiting of the pressure buildup in the at least one brake circuit to the response pressure, it is ascertained that the generator braking torque corresponding to the activation intensity is no longer exertable with the aid of the at least one electric motor, the front wheel inlet valves of the front wheel brake cylinders are controlled from the closed state into an open state, and wherein if, after controlling the front wheel inlet valves from the closed state into the open state, it is ascertained that the generator braking torque corresponding to the activation intensity is once again exertable with the aid of the at least one electric motor, the brake pressure present in the at least one brake circuit is limited to the response pressure by controlling the rear wheel outlet valves into the open state.

8. A control device for a braking system of a vehicle, comprising:

an actuating device, with the aid of which at least one wheel outlet valve of a wheel brake cylinder of at least one brake circuit of the braking system is controlled into an open state, taking into account at least one provided sensor signal with regard to an activation intensity of an activation by a driver of the vehicle of a brake actuating element which is connected to a master brake cylinder of the braking system, whereby a brake pressure buildup at least in the at least one brake circuit is limited, at least temporarily, during an activation of the brake actuating element to a response pressure of a storage volume of the at least one brake circuit;

wherein the actuating device is configured for controlling, at least temporarily, during the activation of the brake actuating element, rear wheel outlet valves of rear wheel brake cylinders which are associated with respective rear wheels of the vehicle, into the open state with the aid of at least one first control signal, and during the provision of the at least one first control signal to the rear wheel outlet valves, for controlling, at least temporarily, front wheel inlet valves of front wheel brake cylinders which are associated with respective front wheels of the vehicle, into a closed state with the aid of at least one second control signal, wherein during the control of the rear wheel outlet valves of the rear wheel brake cylinders into the open state, the front wheel inlet valves of the front wheel brake cylinders are controlled into the closed state in a delayed manner in such a way that the front wheel brake cylinders are pre-filled without a brake pressure buildup.

* * * * *